United States Patent [19]

Kelch

[11] 4,411,239

[45] Oct. 25, 1983

[54] FUEL COOLING SYSTEM FOR USE WITH A CLOSED FUEL INJECTION CIRCUIT IN A DIESEL ENGINE

[75] Inventor: Heinz Kelch, Königsfeld, Fed. Rep. of Germany

[73] Assignee: Kienzle Apparate GmbH, Fed. Rep. of Germany

[21] Appl. No.: 349,270

[22] Filed: Feb. 16, 1982

[30] Foreign Application Priority Data

Feb. 26, 1981 [DE] Fed. Rep. of Germany ....... 3107141

[51] Int. Cl.³ ............................................. F02M 31/00
[52] U.S. Cl. ..................................... 123/557; 123/541; 123/514; 123/516
[58] Field of Search ............... 123/557, 514, 516, 552, 123/41.31

[56] References Cited

U.S. PATENT DOCUMENTS

| 990,741 | 4/1911 | Jacobs | 123/557 |
| 1,319,718 | 10/1919 | Martin | 123/557 |
| 2,599,699 | 6/1952 | Dilworth | 123/514 |
| 4,187,813 | 2/1980 | Stumpp | 123/557 |
| 4,300,514 | 11/1981 | Schaich | 123/557 |
| 4,343,283 | 8/1982 | Shepherd | 123/557 |

FOREIGN PATENT DOCUMENTS 2324888  4/1977  France ............................ 123/514

*Primary Examiner*—Ronald H. Lazarus
*Attorney, Agent, or Firm*—Toren, McGeady and Stanger

[57] ABSTRACT

A cooling system for the fuel used in a diesel engine includes a closed fuel injection circuit and a fuel cooling circuit. The fuel injection circuit receives fuel through a suction pipe from a fuel tank and provides a continuously circulating flow of fuel. The fuel cooling circuit flows fuel from and back into the fuel tank. A heat exchanger is connected to both of the circuits and flows the fuel from the fuel injection circuit in indirect heat transfer relation with the fuel in the cooling circuit for removing heat from the fuel in the injection circuit.

8 Claims, 3 Drawing Figures

4,411,239

FUEL COOLING SYSTEM FOR USE WITH A CLOSED FUEL INJECTION CIRCUIT IN A DIESEL ENGINE

SUMMARY OF THE INVENTION

The present invention is directed to a system for cooling the fuel circulating in a closed fuel injection circuit of a diesel engine. The closed injection circuit is connected to a fuel tank via a suction pipe.

In the operation of a diesel engine it is known that substantially more fuel is conveyed by the fuel supply pump than is supplied by the injection pump into the engine for use in combustion. The excess fuel which also serves to cool the injection pump flows back into the fuel tank. In this conventional and relatively simple operating system gauging the fuel consumption would be possible by determining the flow of fuel to the injection pump and the return from the injection pump. Similar volume gauges are used to check both flows of fuel and by a suitable subtraction of the measured quantitative values the actual fuel consumption is determined.

Such a system has known problems, for instance, the double measuring operation plus errors in establishing the measured values has compelled the search for other systems of measuring the fuel used. In another system a single volume gauge is employed with one operating system which includes a closed fuel injection cycle with the fuel being circulated by a fuel supply pump. The quantity of fuel "consumed" by the injection pump is drawn out of the fuel tank through a suction pipe connected to the fuel injection circuit and the volume gauge is also connected to the suction pipe.

In such an operating system the fuel flowing through the injection circuit is heated to a considerable extent. While a diesel engine run on heated fuel seems to lose power, in fact the power of the engine decreases because the heated injected fuel supplies less energy when the injected volume is the same instead of being weight-adjusted. Further, the cooling function of the injection circuit is lost to the injection pump.

Therefore, it has been attempted to conduct the injection circuit through the fuel tank or through a cooling element located in the fuel tank. The result of such a procedure is that the fuel in the tank becomes heated with heated fuel flowing through the volume gauge. In some respects this is not disadvantageous, since it reduces the paraffin deposition in the fuel filter connected in series with the volume gauge.

Such a cooling arrangement can, at its simplest, be composed of a few hose coils positioned in the fuel tank. The placement of the cooling element and its leakproof connection to the fuel injection cycle, especially when there is replacement of parts in a motor vehicle, presents considerable difficulties varying with the type of motor vehicle, if when the fuel tank is manufactured suitable precautions are not taken to make it possible to mount on the fuel tank the required connections between the cooling element and the injection circuit.

To limit the difficulties experienced with such an arrangement, it has been proposed that the devices for introducing the injection circuit into the fuel tank, and for connecting the cooling element fixed in the fuel tank with the injection cycle, be arranged at the tank connection or at an extension piece joined to the tank connection. With such an arrangement boring and assembling procedures could have been avoided. The many types of tanks and the multiple designs of tank connections make such a solution questionable.

Moreover, the cooling effect is unsatisfactory when the cooling element is located in the fuel tank. With the cooling element in the fuel tank, because the contents in the tank fluctuates, the transfer of heat to the fuel in the tank proceeds irregularly. Further, because of the insufficient intermixture of the relatively large mass of fuel and the poor thermal transfer, along with the insufficient radiation of heat from the fuel tank there is a relatively sluggish removal of heat and the fuel in the tank becomes heated to too great an extent. Furthermore, the space within the tank is considerably reduced if a sufficiently effective cooling element is mounted in the tank.

As a result, it has been proposed to route the injection circuit through a separate, specially constructed cooling tank or to introduce it into such a cooling tank which would at the same time serve as a gas separator or gas trap. In either case the cooling effect is inadequate with the removal of heat from the tank taking place very slowly. Moreover, in this solution of the problem, quite apart from the problems of space and arrangement which arise when such a cooling tank is used, the advantage gained is lost when heated fuel is conveyed through the volume gauge.

Therefore, the primary object of the present invention is, based on the above-described diesel engine operating system to provide a cooling arrangement where the cooling effect is considerably improved over what has been done in the past. Additionally, the cooling system is constructed so that its installation is, to a great extent, independent of the type of motor vehicle and consequently is suitable for an installation requiring a minimum of space and assembly labor.

In accordance with the present invention, a heat exchanger is provided through which the fuel from the injection circuit flows in indirect heat transfer relation with fuel flowing through a cooling circuit with the fuel in the cooling circuit being circulated from the fuel tank by an additional fuel supply pump.

In a preferred embodiment the heat exchanger is a double pipe member with one pipe encircling the other and forming an annular space between them. Preferably, the inner pipe is connected to the cooling circuit and the outer pipe is connected to the injection circuit. The diameters of the inner and outer pipes are selected so that there is a sufficient annular space for the flow of fuel. Furthermore, the inner and outer pipes are formed of a high-heat conductive material and are shaped in the form of a coil.

The improved cooling effect achieved by means of the invention is based on the close thermal contact between the fuel in the injection circuit and the fuel in the cooling cirucit, along with the constant removal of the heated fuel from the heat exchanger. Moreover, besides the intensive intermixture in the fuel tank, particularly in the preferred embodiment, two noticeable advantages are the heat radiation available from the large surface of the heat exchanger and because the outer location of the injection circuit fuel can be cooled by the slipstream if the heat exchanger is suitably arranged in the motor vehicle. The preferred embodiment, which meets the other requirements of the invention, affords an arrangement which is especially easy to manufacture and can be mounted almost anywhere in the motor vehicle, but, in particular, it can be mounted where it does not have to satisfy the high mechanical demands placed on a unit located on the outside of the motor vehicle.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
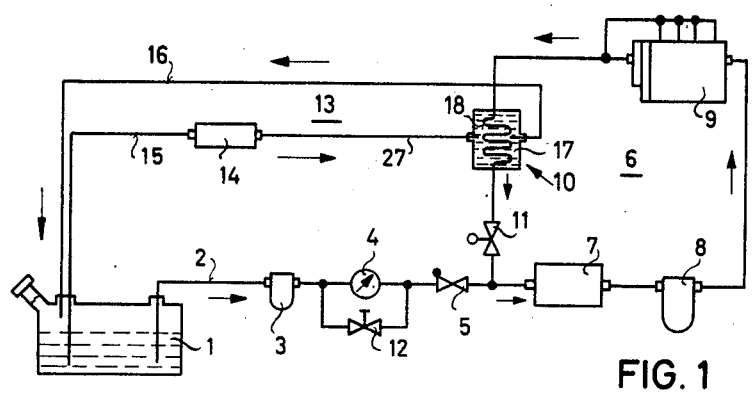
FIG. 1 is a simplified schematic representation of the operating system of a diesel engine incorporating the present invention.

In the schematic representation in FIG. 1, a fuel tank 1 is connected by a suction pipe 2 to a closed fuel injection circuit 6. Between the fuel tak 1 and the circuit 6, the suction pipe contains a primary filter 3 closer to the tank followed by a volume measuring device 4 with a check valve between the measuring device and the connection of the suction pipe to the closed fuel injection circuit. In the fuel injection circuit a certain amount of fuel is kept in circulation, in a known manner, by a fuel supply pump 7 which receives fuel from the suction pipe and passes it through, in turn, a main filter 8, an injection pump 9, a heat exchanger 10 and then a reintroduction feed valve 11 before the circuit is completed at the connection with the suction pipe 2. A bypass 12 extends around the volume measuring device 4 in the suction pipe 2 to provide a path around the device in the event of any disturbance. A fuel cooling circuit 13 is connected at its inlet and outlet ends to the fuel tank 1 and is also connected to the heat exchanger 10. The fuel flowing through the cooling circuit 13 passes in indirect heat transfer relation within the heat exchanger 10 with the fuel flowing through the injection circuit 6. A suction pipe 15 carries fuel from the tank 1 through the cooling circuit to another fuel supply pump 14 which maintains the circulation of the fuel through the cooling circuit. After its passage through the heat exchanger 10 the fuel in the cooling circuit 13 flows through a return pipe 16 back into the fuel tank. In the embodiment shown in FIG. 1, the heat exchanger is a closed container 17 receiving the fuel from the cooling circuit 13 with a cooling element 18 passing the fuel in the injection circuit 6 in indirect heat transfer with the cooling fuel within the container 17. As a result, there is a continuous flow of cool fuel from the fuel tank 1 through the heat exchanger 10 providing heat removal and effective cooling of the fuel flowing in the injection circuit 6.

Figure 3:
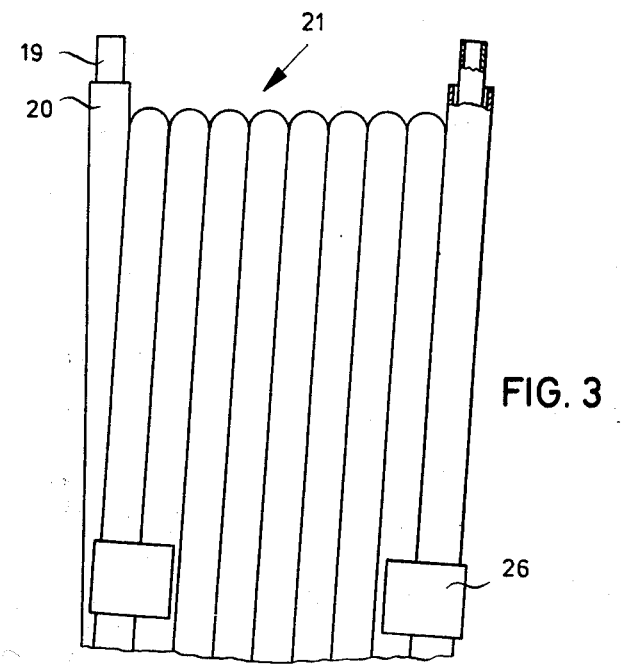
FIG. 3 is a side view of the preferred arrangement shown in FIG. 2.
Figure 2:
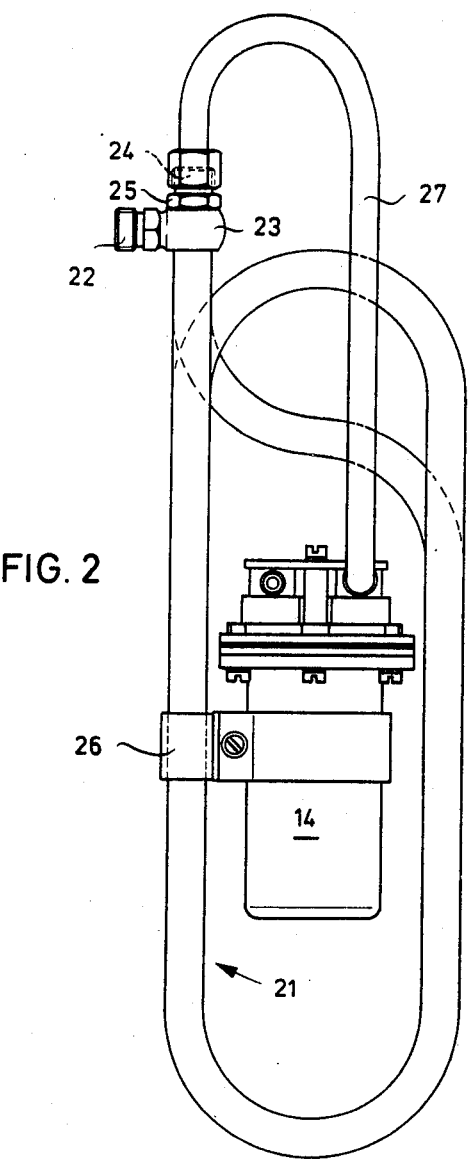
FIG. 2 is an end view of a preferred embodiment of the heat exchanger incorporating the present invention.

In FIGS. 2 and 3 a preferred embodiment of the heat exchanger is illustrated made of pipe or tubing, preferably copper tubing. In this embodiment the copper tubing forms both the cooling element and the container. The heat exchanger includes a first smaller diameter pipe 19 located within a second pipe 20. The pipes 19, 20 are shaped in a common arrangement to form a coil 21 with a flat oval cross-section. The outside diameter of the inner pipe, for instance, 10 mm, and the inner diameter of the outside pipe, for instance, 13 mm, are selected so that an annular flow space is provided between the two pipes. The ends of the pipes are provided with connection means, one at each pipe end, for joining one of the pipes to the closed fuel injection circuit 6 and the other to the fuel cooling circuit 13. In FIG. 2, hollow rings 23 with a threaded connection member 22 are secured on the outer pipe 21 providing a liquid-tight connection. A hollow nut 25 is connected about the hollow ring 23 with a union or connector 24 provided to couple the inner pipe 19 with the pipe 27 forming a part of the cooling circuit 13 and joining the pump 14 to the heat exchanger 10. FIG. 2 also shows holding device 26 securing the coil 21 formed of the pipes 19, 20 onto the fuel supply pump 14. This attachment is arranged so that the pump 14 is located within the space enclosed by the pipe coils so that the space is utilized and an operational assembly is provided. The pipe connection 27 between the pump 14 and the heat exchanger is a flexible member.

This embodiment of the heat exchanger is especially easy to manufacture and, in contrast to the arrangement shown in FIG. 1, flows the fuel from the cooling circuit 13 through the inner pipe while the annular flow space between the inner pipe 19 and the outer pipe 20 conducts the fuel passing through the injection circuit 6. Accordingly, the slipstream can provide an additional cooling effect as it flows over the outer pipe 20 and, further, radiation cooling can also be achieved.

While specific embodiments of the invention have been shown and described in detail to illustrate the application of the inventive principles, it will be understood that the invention may be embodied otherwise without departing from such principles.

I claim:

1. A cooling system for the fuel used in a diesel engine comprises a fuel tank, a suction pipe connected at one end to said fuel tank, a closed fuel injection circuit connected to the other end of said suction pipe for receiving fuel from said fuel tank, a fuel cooling circuit having an inlet end and an outlet end each opening into said fuel tank, a fuel pump for circulating fuel through said fuel cooling circuit, a heat exchanger connected to said fuel cooling circuit and to said closed fuel injection circuit for circulating the fuel flowing in said closed circuit in indirect heat transfer relation with the fuel circulating in said fuel cooling circuit.

2. A cooling system, as set forth in claim 1, wherein said heat exchanger comprises a first pipe, a second pipe encircling and laterally enclosing said first pipe and forming an annular flow space therebetween so that fuel from one of said circuits passes through the first pipe while flow from the other said circuit passes through the annular space between said first and second pipes.

3. A cooling system, as set forth in claim 2, wherein said first pipe is connected to said cooling circuit and the annular space between said first and second pipe is connected to said closed fuel injection circuit.

4. A cooling system, as set forth in claims 2 or 3, wherein said first and second pipes are formed of a high heat conducting material and are shaped to form a coil.

5. A cooling system, as set forth in claim 4, wherein said first and second pipes are formed of copper.

6. A cooling system, as set forth in claim 5, wherein said coil formed by said first and second pipes have a flat oval transverse cross-secional shape.

7. A cooling system, as set forth in claim 6, including support means secured to said coil and said pump for circulating fuel through said fuel cooling circuit for supporting said pump within the space enclosed by said pipe coil.

8. A cooling system, as set forth in claim 1, wherein said fuel pump for circulating fuel through said fuel cooling circuit is located between the inlet end of said cooling circuit and said heat exchanger, said heat exchanger comprises a container receiving the fuel flowing through said fuel cooling circuit, and a tubular cooling element located within said container and connected serially with said closed fuel injection circuit for flowing the fuel in the injection circuit in indirect heat transfer relation with the fuel from said cooling circuit within said container.

* * * * *